(12) United States Patent
Kim et al.

(10) Patent No.: US 10,316,736 B2
(45) Date of Patent: Jun. 11, 2019

(54) CAR INTERCOOLER PIPE HAVING LOW VIBRATION PROPERTIES

(71) Applicants: HYUNDAI MOTOR COMPANY, Seoul (KR); KIA MOTORS CORPORATION, Seoul (KR)

(72) Inventors: Gi-Hwan Kim, Yongin-si (KR); Chi-Hoon Choi, Soowon-shi (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 6 days.

(21) Appl. No.: 15/550,598

(22) PCT Filed: Mar. 31, 2015

(86) PCT No.: PCT/KR2015/003184
§ 371 (c)(1),
(2) Date: Aug. 11, 2017

(87) PCT Pub. No.: WO2016/129743
PCT Pub. Date: Aug. 18, 2016

(65) Prior Publication Data
US 2018/0023456 A1  Jan. 25, 2018

(30) Foreign Application Priority Data
Feb. 13, 2015  (KR) .................. 10-2015-0021943

(51) Int. Cl.
*F16L 9/12* (2006.01)
*F02B 29/04* (2006.01)
*F02M 35/10* (2006.01)

(52) U.S. Cl.
CPC .......... *F02B 29/0475* (2013.01); *F02B 29/04* (2013.01); *F02M 35/10137* (2013.01);
(Continued)

(58) Field of Classification Search
CPC ........... F16L 27/11; F16L 11/11; F16L 55/033
(Continued)

(56) References Cited

U.S. PATENT DOCUMENTS 5,476,080 A * 12/1995 Brunnhofer ............ B60K 15/01
123/198 D
5,960,977 A * 10/1999 Ostrander ............... F16L 11/15
138/145
(Continued)

FOREIGN PATENT DOCUMENTS

JP          06-008384 Y2      3/1994
JP          2002-039450 A     2/2002
(Continued)

OTHER PUBLICATIONS

Material NVH Convergence Technology for a Plastic Intercooler Pipe, SAE Technical Paper #2014-01-1040, Apr. 1, 2014.
(Continued)

*Primary Examiner* — Patrick F Brinson
(74) *Attorney, Agent, or Firm* — Morgan, Lewis & Bockius LLP

(57) ABSTRACT

A car intercooler pipe includes an inlet of the intercooler pipe positioned at an upper side of the car intercooler pipe, an upper corrugated portion having upper corrugated bodies protruding in a rib shape from a surface of a pipe body extending in a direction toward the inlet, an outlet of the intercooler pipe positioned at a lower side of the car intercooler pipe, a lower corrugated portion, and an intermediate portion bent downward from the upper corrugated portion and having the pipe body connected to the lower corrugated portion, wherein a thickness of the pipe body of the intermediate portion is greater than a thickness of the upper corrugated body of the upper corrugated portion and a thickness of the lower corrugated body of the lower corrugated portion, and wherein disconnection portions having
(Continued)

corrugations with different heights are formed in the upper corrugated body and the lower corrugated body.

5 Claims, 9 Drawing Sheets

(52) U.S. Cl.
CPC ............ *F02M 35/10144* (2013.01); *F02M 35/10268* (2013.01); *F02M 35/10354* (2013.01); *F02M 35/10321* (2013.01); *F02M 35/10347* (2013.01); *Y02T 10/146* (2013.01)

(58) Field of Classification Search
USPC .............................. 138/121, 122, 109, 118
See application file for complete search history.

(56) References Cited

U.S. PATENT DOCUMENTS

2002/0062873 A1\* 5/2002 Nakagawa ....... F02M 35/10137
138/122
2015/0042086 A1 2/2015 Kim et al.

FOREIGN PATENT DOCUMENTS

JP 2002-257281 A 9/2002
KR 20-2009-0002080 U 3/2009

OTHER PUBLICATIONS

International Search Report for International Application No. PCT/KR2015/003184, dated Feb. 13, 2015, 3 pages.

\* cited by examiner

PRIOR ART

CAR INTERCOOLER PIPE HAVING LOW VIBRATION PROPERTIES

CROSS-REFERENCE TO RELATED APPLICATION

This application is the U.S. National Phase under 35 U.S.C. § 371 of International Application No. PCT/KR2015/003184 filed on Mar. 31, 2015, which claims priority to Korean application 10-2015-0021943 filed on Feb. 13, 2015. The entire contents of these applications are incorporated by reference herein.

TECHNICAL FIELD

The present disclosure relates to a car intercooler pipe, and more particularly, to a car intercooler pipe which varies in thickness to have different mass and varies in material to have different stiffness in order to effectively prevent vibration of a throttle body from being transmitted to an intercooler and a side member of a vehicle body through the intercooler pipe, such that the amount of change in impedance of the intercooler pipe is increased so that a progressive wave of vibration is reflected, and as a result, the amount of vibration transmitted through the intercooler pipe is reduced.

BACKGROUND

In general, air introduced from the outside of a vehicle is compressed by a turbocharger device, cooled by an intercooler, and then introduced into an engine.

A car intercooler pipe is connected between the intercooler and a throttle body of the engine, and serves as a flow path through which the air cooled by the intercooler flows to the throttle body of the engine.

FIG. 1 illustrates a structure of a car intercooler pipe in the related art.

The car intercooler pipe in the related art has a structure in which an inlet side rubber pipe 2 is installed at an inlet of a pipe body 1 made of aluminum, an outlet side rubber pipe 3 is installed at an outlet of the pipe body 1, and the rubber pipes 2 and 3 are fixed by clamps 4.

However, the car intercooler pipe in the related art has a drawback in that costs and weight are increased because the pipe body made of aluminum and the rubber pipes are used.

Thus, an intercooler pipe, which is entirely made of a plastic material using thermoplastic ether-ester elastomer (TEEE) in order to reduce costs and weight, has been proposed in the related art.

However, vibration and noise performance of the plastic intercooler pipe deteriorates in comparison with the intercooler pipe in the related art illustrated in FIG. 1, and as a result, there is a problem in that it is difficult to apply the intercooler pipe to a vehicle.

Meanwhile, in the case of passenger vehicles, structures and arrangements of power transmission systems (power train) are different from one another depending on the type of vehicle, but a method of supporting a transmission and the engine, among the power transmission systems, on a vehicle body is mainly and broadly classified into a 4-point mounting method (which provides four main connecting points between the power train and the vehicle body) and a 3-point mounting method (which provides three main connecting points between the power train and the vehicle body).

The 3-point mounting method is widely used for middle-sized or small-sized vehicles, an application field of the 3-point mounting method is being gradually expanded, and the 3-point mounting method causes a relatively greater rolling motion of the engine in comparison with the 4-point mounting method. Therefore, there is a problem in that a large amount of noise and vibration are transmitted through the intercooler pipe of the vehicle to which the 3-point mounting method is applied, and as a result, there is a need for a solution to the problem.

SUMMARY

The present disclosure has been made in an effort to solve the aforementioned problems in the related art, and an object of the present disclosure is to provide a car intercooler pipe having low vibration properties, which is capable of achieving vibration and noise performance equal to or better than that of an intercooler pipe in the related art even though the car intercooler pipe is entirely made of a plastic material.

Another object of the present disclosure is to provide a structure for mounting an intercooler pipe, which may permit a connecting portion to slip in accordance with a behavior of an engine and ensure flexibility in particular directions (directions in which a throttle body mainly vibrates) in order to inhibit the transmission of vibrations and reduce the occurrence of noise.

To achieve the aforementioned objects, a car intercooler pipe having low vibration properties according to the present disclosure varies in thickness to have different mass and varies in material to have different rigidity in order to effectively prevent vibrations of a throttle body from being transmitted to an intercooler and a side member of a vehicle body through the intercooler pipe, such that the amount of change in impedance of the intercooler pipe is increased so that a progressive wave of vibration is reflected, and as a result, the amount of vibration transmitted through the intercooler pipe is reduced.

According to the car intercooler pipe having low vibration properties according to the present disclosure which has the aforementioned configuration, an upper corrugated portion, a lower corrugated portion, and a intermediate portion have different thicknesses and different materials, and vibration transmitted from the throttle body is attenuated due to a mass impedance effect and a stiffness impedance effect, thereby achieving an effect of reducing noise and vibration of the vehicle.

In addition, since the intercooler pipe rotates (slips) in accordance with a behavior of the engine, it is possible to inhibit transmission of vibration generated by the engine and inhibit noise which occurs when the intercooler pipe having the structure in the related art is twisted.

In addition, disconnection portions are formed to additionally adjust flexibly in a particular direction and prevent contact between the intercooler pipe and a peripheral component, and the disconnection portions are disposed along first and second rows spaced apart from each other, thereby permitting the rotation of the intercooler pipe in order to more efficiently attenuate vibrations generated in a left and right direction or an up and down direction as well as a front and rear direction.

In addition, since the mass and stiffness mismatch structures are applied to the intercooler pipe of the present disclosure, the material and/or the length of the intermediate portion vary/varies to adjust properties of the reflective wave with respect to the progressive wave, and as a result, it is possible to obtain an effect of performing tuning for reducing vibrations and noise in a particular frequency region in accordance with the type of vehicle to which the intercooler pipe of the present disclosure is applied.

DETAILED DESCRIPTION

Figure 1:
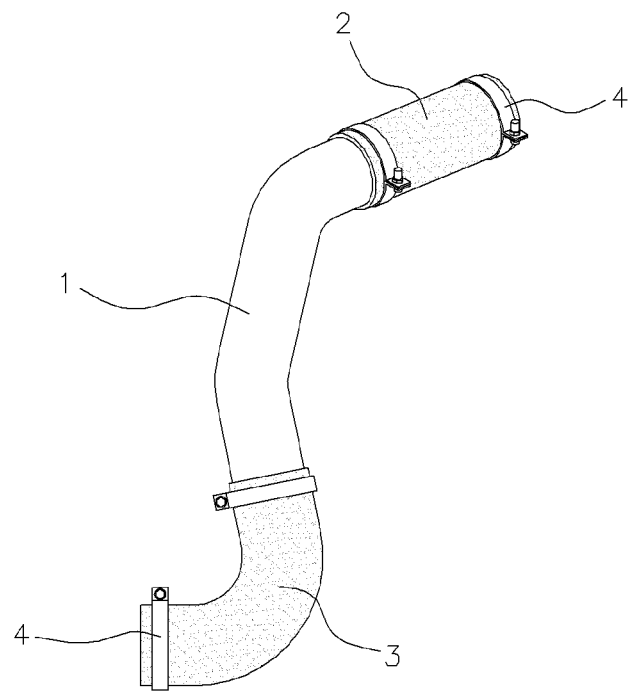
FIG. 1 is a perspective view of an intercooler pipe according to the related art.

Hereinafter, a configuration of a car intercooler pipe having low vibration properties according to the present disclosure will be described in detail with reference to the accompanying drawings.

However, the disclosed drawings are provided as an example for fully transferring the concepts of the present disclosure to those skilled in the art. Therefore, the present disclosure is not limited to the drawings disclosed below, and may be specified as other aspects.

In addition, unless otherwise defined, the terminologies used in the specification of the present disclosure have the meanings that a person with ordinary skill in the technical field to which the present disclosure pertains typically understands, and in the following description and the accompanying drawings, a detailed description of publicly known functions and configurations will be omitted so as to avoid unnecessarily obscuring the subject matter of the present disclosure.

In the related art, the reason why an intercooler pipe made of a plastic material is vulnerable to vibration and noise is that vibration transmitted from an engine is transmitted to an intercooler through the intercooler pipe, and vibration transmitted to the intercooler vibrates a side member of a vehicle body, which causes vibration and noise in the interior of the vehicle, and this phenomenon occurs because a progressive wave of vibration transmitted from the engine passes through a medium pipe made of the same material almost without a loss of the progressive wave and the vibration is rarely, or minimally, attenuated.

Therefore, the present inventors have devised a structure of an intercooler pipe in which an inlet portion, an outlet portion, and an intermediate portion of the intercooler pipe are made of different types of synthetic resin materials, instead of manufacturing the entire intercooler pipe by using the same material, and the inlet portion, the outlet portion, and the intermediate portion have different thicknesses.

According to the intercooler pipe of the present disclosure based on the aforementioned concept, when the progressive wave of vibration from the engine is transmitted to the intermediate portion from the inlet portion, the progressive wave of vibration passes through a medium of the inlet portion and a medium of the intermediate portion which are different from each other in material and thickness. Due to the difference in material and thickness of the media, a reflective wave is formed with respect to the progressive wave of vibration, such that components of the progressive wave of vibration are dissipated as the progressive wave and the reflective wave overlap each other, and as a result, vibration is attenuated.

Furthermore, the present inventors have confirmed that when the progressive wave of vibration passes from the intermediate portion to the outlet portion, the progressive wave of vibration passes through the medium of the intermediate portion and a medium of the outlet portion, which are different from each other in material and thickness, and because of the difference in material and thickness of the media, a reflective wave is formed with respect to the progressive wave of vibration, such that components of the progressive wave of vibration are dissipated as the progressive wave and the reflective wave overlap each other. As a result, vibration is attenuated once again, and as described above, the components of the progressive wave of vibration are dissipated at least twice and vibration is also attenuated, such that an effect of attenuating vibration is equal to that in the related art or more improved than that of the related art in a particular section, and have shown that the intercooler pipe of the present application can be effectively applied to actual vehicles, thereby completing the present disclosure.

In the detailed description of the present disclosure, the structures for attenuating vibration according to the present application are referred to as a mass impedance mismatch structure with different thicknesses and a stiffness impedance mismatch structure with different types of materials, and hereinafter, specific exemplary embodiments of the intercooler pipe of the present disclosure will be described in detail with reference to the accompanying drawings.

Figure 2:
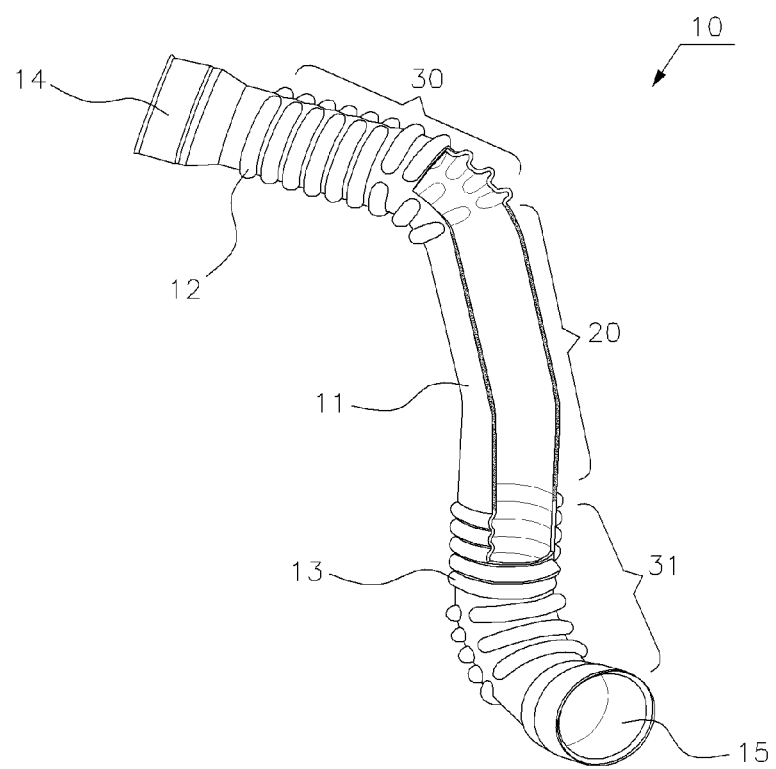
FIG. 2 is a partially cut-away perspective view of an intercooler pipe according to exemplary embodiments of the present disclosure.
Figure 3:
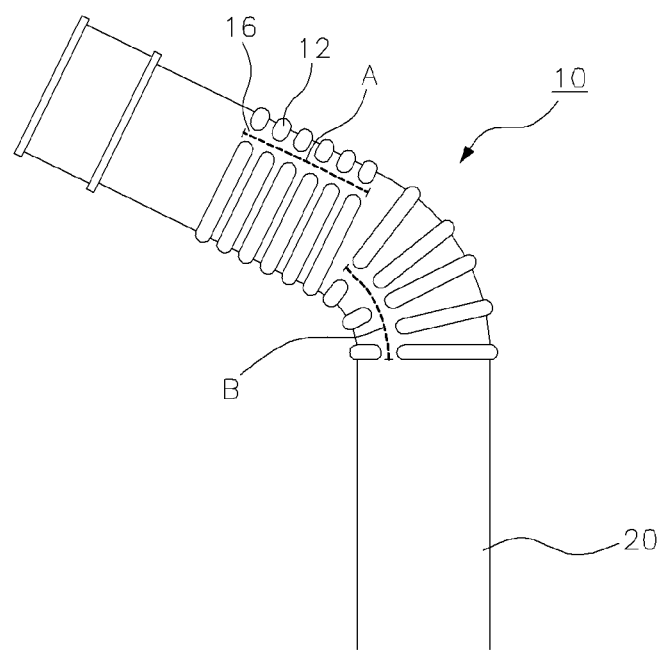
FIG. 3 is a top side view of an intercooler pipe according to exemplary embodiments of the present disclosure.
Figure 4:
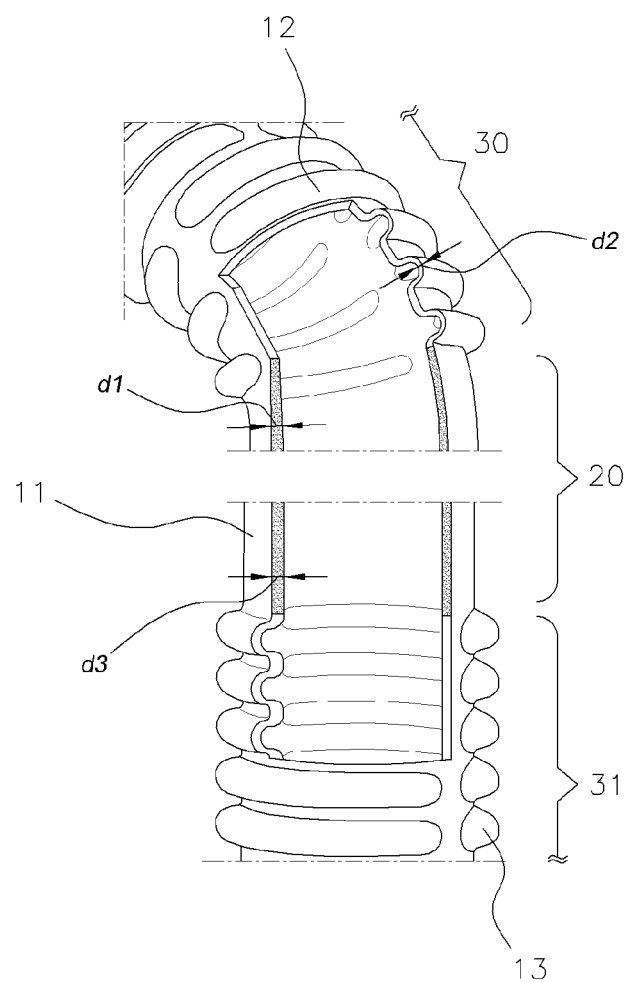
FIG. 4 is a partially cut-away perspective view illustrating an enlarged main part of the intercooler pipe of the present disclosure.

FIG. 2 is a partially cut-away perspective view of an intercooler pipe according to exemplary embodiments of the present disclosure, FIG. 3 is a top side view of the intercooler pipe of the present disclosure, and FIG. 4 is a partially cut-away perspective view illustrating an enlarged main part of the intercooler pipe of the present disclosure.

As described above, a car intercooler pipe 10 of the present disclosure is characterized by being configured such that a thickness and a material of the intercooler pipe vary for each section of the pipe in order to prevent vibrations of a throttle body from being transmitted to an intercooler and a side member of a vehicle body through the intercooler pipe.

As illustrated in the partially cut-away perspective view in FIG. 2, the intercooler pipe 10 of the present disclosure includes an inlet 14 of the intercooler pipe positioned at an upper side, an upper corrugated portion 30 which has upper corrugated bodies 12 protruding in a rib shape from a surface of a pipe body 11 extending in a direction toward the inlet 14, an outlet 15 of the intercooler pipe positioned at a lower side, a lower corrugated portion 31 having lower corrugated bodies 13 protruding in a rib shape from a surface of the pipe body 11 extending in a direction toward the outlet 15, and an intermediate portion 20 bent downward from the upper corrugated portion 30 and has the pipe body 11 connected to the lower corrugated portion 31.

In addition, as illustrated in the side view in FIG. 3, each of the upper corrugated body 12 and the lower corrugated body 13 protrudes in a ring shape around the intercooler pipe 10 from the surface of the intercooler pipe 10, and has a disconnection portion 16 which has a different protruding height (has a lower protruding height or does not protrude partially).

Since the disconnection portions 16 are formed, flexibility of the intercooler pipe 10 relatively deteriorates (stiffness is relatively increased) in a direction in which the disconnection portions 16 are formed, such that bending is restricted.

Since the disconnection portions 16 are formed, a force required to bend the intercooler pipe 10 in a particular direction a force required to bend the intercooler pipe 10 in another direction are different from each other.

That is, in exemplary embodiments of the present disclosure, the disconnection portions 16 are disposed to form rows in the form of straight lines in a longitudinal direction of the intercooler pipe 10, and as illustrated in FIG. 3, the disconnection portions 16 may be disposed in the form of staggered straight lines in a plurality of particular directions so as to induce the intercooler pipe 10 to slip or induce the upper corrugated body 12 and the lower corrugated body 13 to be bent.

That is, the rows, which are constituted by the disconnection portions 16, include a first row A and a second row B which are disposed to be adjacent to each other in the longitudinal direction on each of the upper corrugated body 12 and the lower corrugated body 13, and the first row A and the second row B are formed at positions spaced apart from each other around each of the upper corrugated body 12 and the lower corrugated body 13.

With the disconnection portions 16 formed at the positions spaced apart from each other, flexibility and stiffness may be adjusted in a particular direction. Therefore, since the disconnection portions 16 are formed, stiffness of the intercooler pipe 10 is further increased, and flexibility is increased in a direction in which vibration mainly occurs, thereby more efficiently inhibiting noise and vibration.

Furthermore, the first row A and the second row B along which the disconnection portions 16 are disposed in a front and rear direction and an up and down direction (or a left and right direction, based on the vehicle body), thereby more efficiently insulating vibration frequencies with different properties and inducing the intercooler pipe 10 to slip.

Hereinafter, an operation of the intercooler pipe of the present disclosure, which is configured as described above, will be described in detail with reference to the enlarged partially cut-away perspective view in FIG. 4.

The reason why vibration is caused by the intercooler pipe made of a plastic material as described above is impedance properties of the medium that transmits vibration. That is, if the media for transmitting vibration has a constant shape or is the same material, the amount of change in impedance is small, such that vibration is easily transmitted.

In this case, the amount of change in impedance of the medium is in conjunction with the amount of change in mass, stiffness and damping of the medium.

That is, the amount of change in impedance between a vibration excitation point of a medium to which vibration is applied and a vibration receiving point of the medium which receives vibration is increased as the amount of change in mass, stiffness, and damping between the vibration excitation point and the vibration receiving point is increased, such that an impedance mismatch occurs between the vibration excitation point and the vibration receiving point. As the impedance mismatch is increased, the progressive wave of vibration is reflected, such that vibration transmitted through the medium is decreased.

To apply the impedance mismatch properties to the intercooler pipe of the present disclosure, the intercooler pipe of the present disclosure has a mass impedance mismatch structure in which the thickness of the pipe body varies for each section.

That is, as illustrated in FIG. 4, a thickness d1 of the pipe body 11 of the intermediate portion 20 is greater than a thickness d2 of the upper corrugated body 12 of the upper corrugated portion 30 and than a thickness d3 of the lower corrugated body 13 of the lower corrugated portion 31, such that the mass of the intermediate portion 20 is larger than the mass of the upper corrugated portion 30 and the mass of the lower corrugated portion 31.

Thus, since the mass of the upper corrugated portion 30 and the mass of the lower corrugated portion 31 vary, the mass impedance mismatch occurs between the upper corrugated portion 30 and the intermediate portion 20 and between the intermediate portion 20 and the lower corrugated portion 31, such that the progressive wave between the vibration excitation point and the vibration receiving point is reflected. As a result, vibration transmitted through the intercooler pipe is decreased.

In exemplary embodiments of the present disclosure, each of the thicknesses d2 and d3 of the upper corrugated body 12 and the lower corrugated body 13 is 1.3 mm, and the thickness d1 of the pipe body 11 of the intermediate portion 20 is 5 mm.

Furthermore, to further improve the impedance mismatch effect, the stiffness impedance mismatch structure, which uses the materials having different stiffness for each section of the intercooler pipe, is applied to the intercooler pipe of the present disclosure, and different types of synthetic resin materials having a large difference in storage modulus for each section of the intercooler pipe are adopted for the intercooler pipe of the present disclosure.

That is, the upper corrugated portion 30 and the lower corrugated portion 31 are made of a soft synthetic resin material, and the intermediate portion 20 is made of a hard synthetic resin material, such that a difference in storage modulus is present between the upper corrugated portion 30 and the intermediate portion 20 and between the intermediate portion 20 and the lower corrugated portion 31, and as a result, the stiffness impedance mismatch effect occurs.

In exemplary embodiments of the present disclosure, the upper corrugated portion 30 and the lower corrugated portion 31 are made of a polyester (PET) based synthetic resin which is a soft material, and the intermediate portion 20 is made of a polybutylene terephthalate (PBT) based synthetic resin which is a hard material. More specifically, thermoplastic polyester elastomer (TPC-ET) synthetic resin including dicarboxylate-diol polymer and glycol polymer is used as a soft material adopted for the upper corrugated portion 30 and the lower corrugated portion 31, and thermoplastic polyester synthetic resin, which is polybutylene terephthalate (PBT), is used as a hard material adopted for the intermediate portion 20.

In this case, the polyester based synthetic resin, which is the material of the upper corrugated portion 30 and the lower corrugated portion 31, has a storage modulus larger than eight times the storage modulus of the polybutylene terephthalate (PBT) based synthetic resin which is the material of the intermediate portion 20, such that the stiffness impedance mismatch of the intercooler pipe of the present disclosure may effectively occur.

In addition, to allow the upper corrugated portion 30, the lower corrugated portion 31, and the intermediate portion 20 to have different thicknesses and different materials as described above, sequential coextrusion (SeCo) is used to simultaneously fabricate the soft portion of the upper corrugated portion 30, the hard portion of the intermediate portion 20, and the soft portion of the lower corrugated portion 31 in the longitudinal direction of the intercooler pipe by using different types of materials by applying a 3D blow molding process.

Meanwhile, since the mass and stiffness mismatch structures are applied to the intercooler pipe of the present disclosure, the material and/or the length of the intermediate portion 20 may vary/varies to adjust properties of the reflective wave with respect to the progressive wave. As a result, it is possible to obtain an effect of performing tuning for reducing vibration and noise in a particular frequency region in accordance with the type of vehicle to which the intercooler pipe of the present disclosure is applied.

Figure 5:
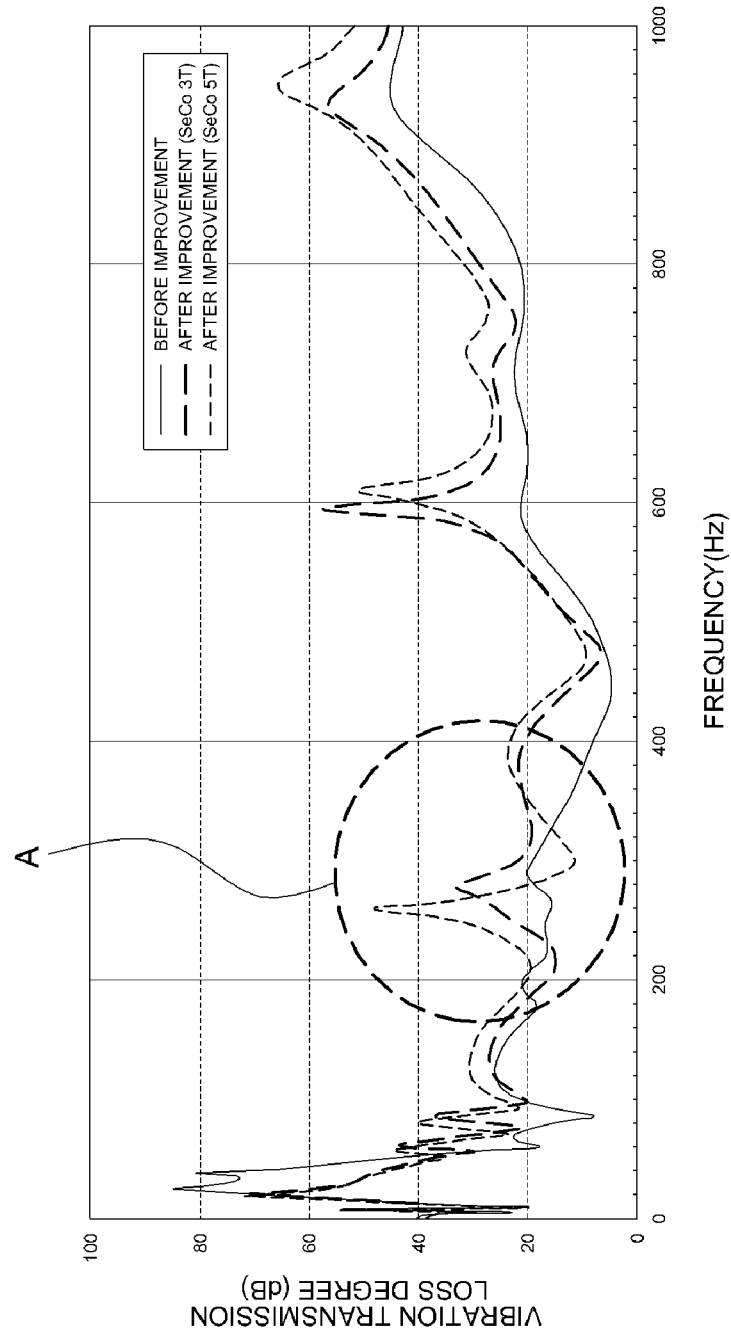
FIG. 5 is a graph illustrating vibration transmission loss degrees of an intercooler pipe according to exemplary embodiments of the present disclosure in accordance with various frequencies.
Figure 6:
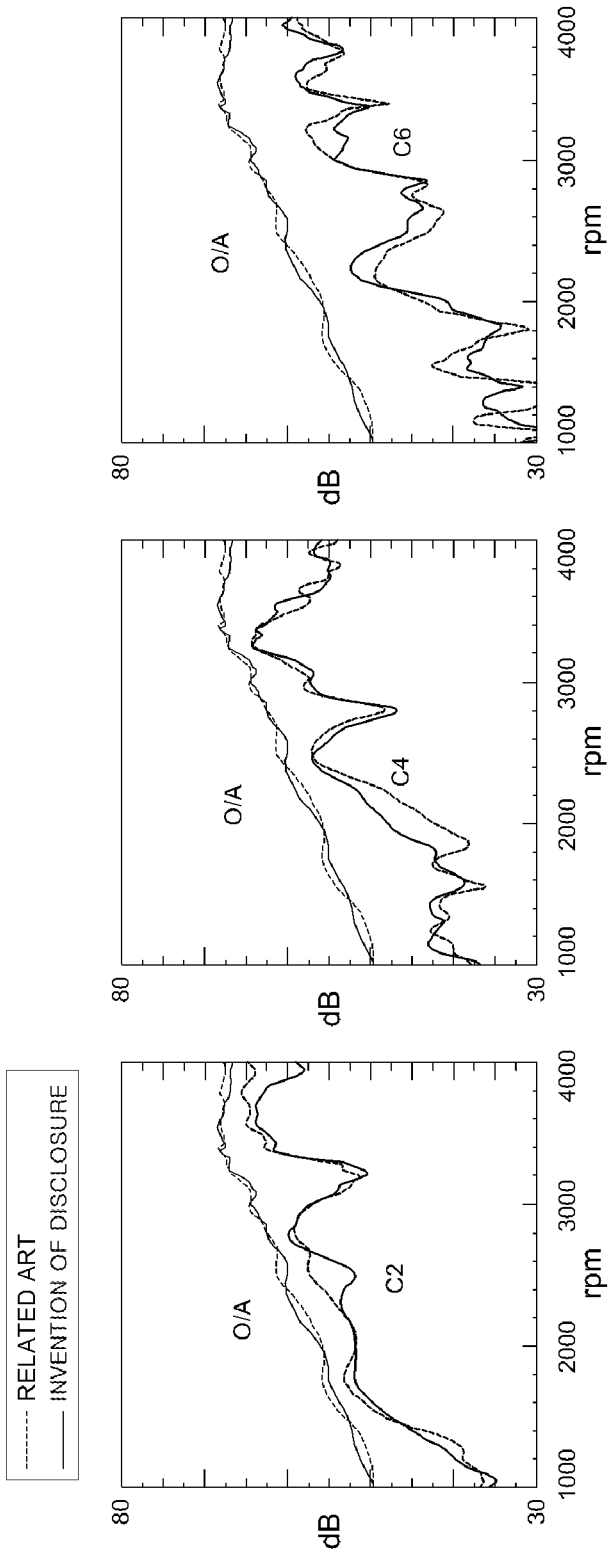
FIGS. 6 and 7 are graphs illustrating noise levels of an intercooler pipe according to exemplary embodiments of the present disclosure in accordance with various rotational speeds of an engine.
Figure 7:
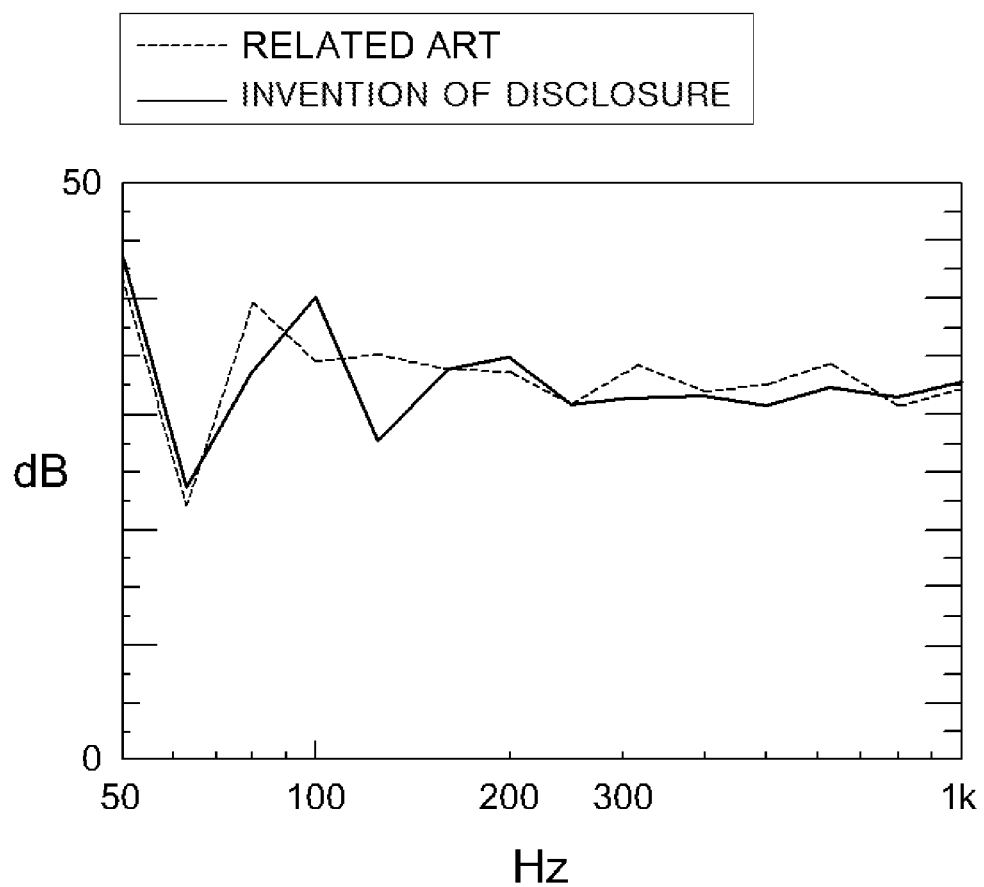

To test vibration reducing performance of the intercooler pipe of the present disclosure which is configured as described above, a test regarding a vibration transmission loss degree was performed as illustrated in the graph in FIG. 5, and a test regarding a noise level was performed as illustrated in the graphs in FIGS. 6 and 7.

FIG. 5 is a graph illustrating vibration transmission loss degrees of the intercooler pipe of the present disclosure in accordance with frequencies, and FIGS. 6 and 7 are graphs illustrating noise levels of the intercooler pipe of the present disclosure in accordance with rotational speeds of the engine.

First, the vibration transmission loss degree was tested between the throttle body, which is the vibration excitation point of the intercooler pipe of the present disclosure, and the intercooler, which is the vibration receiving point of the intercooler pipe.

According to the test result, in a case in which the thickness d1 of the intermediate portion 20 is 3 mm, the vibration transmission loss degrees are greatly distributed in a region of 200 to 450 Hz, which is a target frequency region A, in comparison with the intercooler pipe in the related art as illustrated in FIG. 1. In a case in which the thickness d1 of the intermediate portion 20 is 5 mm, the vibration transmission loss degrees are greatly distributed in a range of 200 to 450 Hz, which is the target frequency region A, in comparison with the case in which the thickness d1 of the intermediate portion 20 is 3 mm, and as a result, it was confirmed that the effect of reducing vibration and noise while the vehicle travels is sufficiently implemented. Here, the large vibration transmission loss degree means that vibration is greatly reduced.

In addition, to test an effect of reducing noise, which is caused by a decrease in vibration, a microphone was mounted at a position corresponding to a driver's ear, and acceleration running noise and idle noise were evaluated.

As a result, as illustrated in FIG. 6, according to the result of testing the acceleration running noise, the intercooler pipe of the present disclosure has a noise level generally equal to a noise level of the intercooler pipe in the related art illustrated in FIG. 1, and particularly, in a frequency region of 200 Hz or higher, an effect of reducing noise was made in comparison with the intercooler pipe in the related art.

In addition, as illustrated in FIG. 7, according to the noise test result while the engine idles, a booming frequency movement is shown in a region of 100 Hz in comparison with the intercooler pipe in the related art illustrated in FIG. 1. This phenomenon describes that a resonant frequency is moved as a weight is reduced in comparison with the intercooler pipe in the related art. In addition, an overall level of the idle noise was equal to the level of the idle noise in the related art.

Meanwhile, the intercooler pipe of the present disclosure may further include a connector 40 which allows the intercooler pipe to rotate (slip) in accordance with behaviors of the engine in order to inhibit transmission of vibration generated by the engine, and inhibit noise which occurs when the intercooler pipe having the structure in the related art is twisted.

Figure 8:
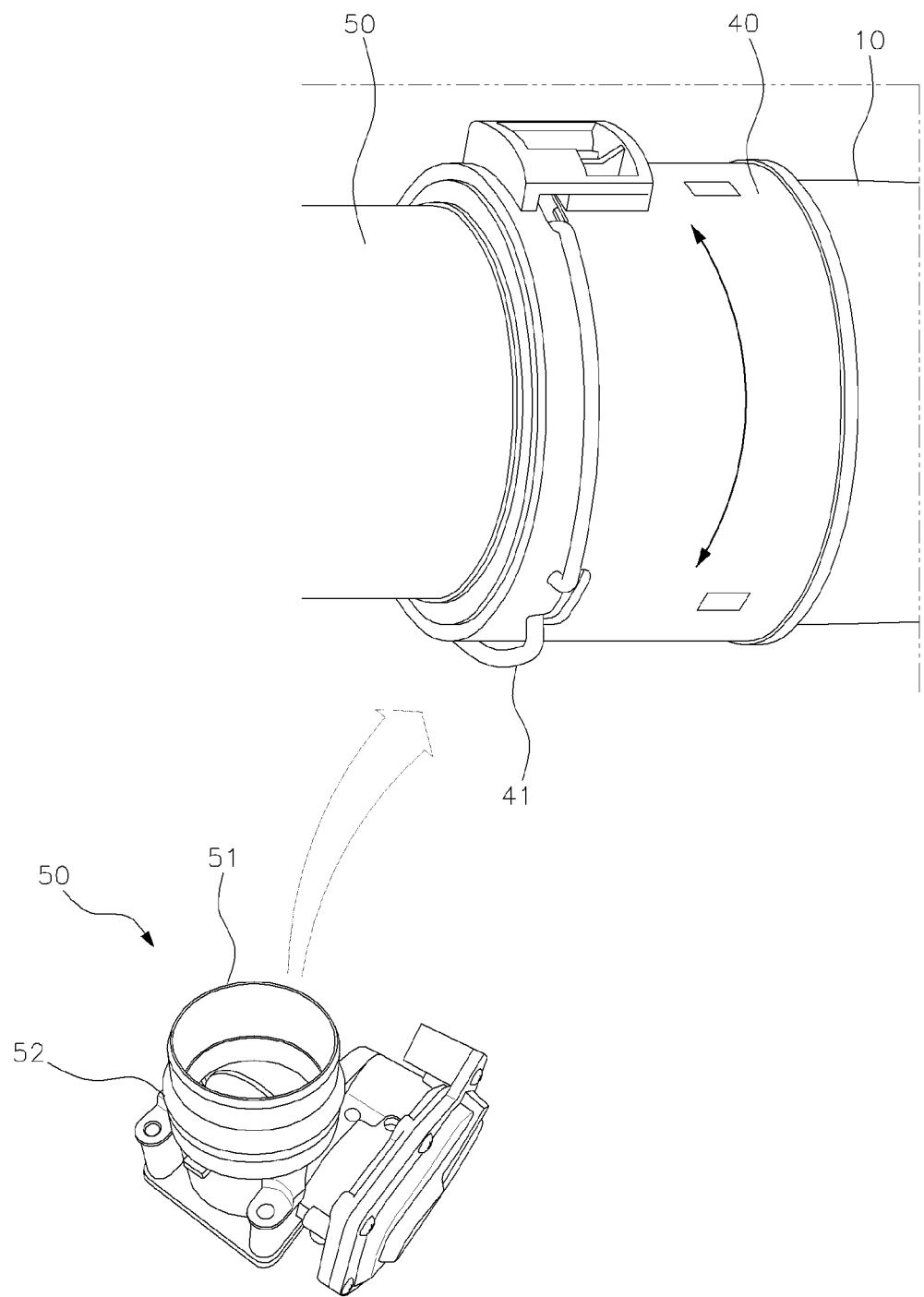
FIG. 8 is a view illustrating a throttle body according to exemplary embodiments of the present disclosure, and a state in which the throttle body is coupled to an intercooler pipe through a connector.
Figure 9:
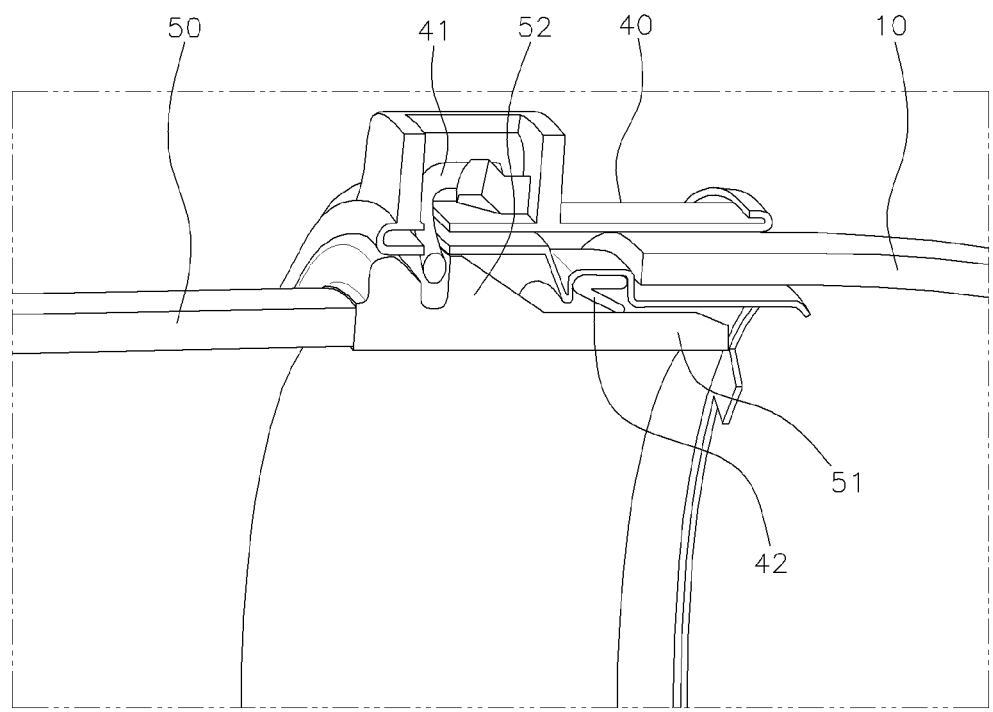
FIG. 9 is a cross-sectional view of a portion where the throttle body is coupled to the intercooler pipe as illustrated in FIG. 8.

FIG. 8 is a view illustrating a throttle body according to exemplary embodiments of the present disclosure, and a state in which the throttle body is coupled to the intercooler pipe through a connector, and FIG. 9 is a cross-sectional view of a portion where the throttle body is coupled to the intercooler pipe as illustrated in FIG. 8.

Referring to the drawings, a typical throttle body 50 has a tubular connecting port 51 connected to the intercooler pipe 10, and as illustrated in FIG. 8, the throttle body 50 has a catching projection 52 that protrudes to a predetermined height from an outer circumferential surface of the connecting port 51 around the outer circumferential surface of the connecting port 51. One side of the catching projection 52 is formed as an inclined surface, and the other side of the catching projection 52 is formed as a flat vertical surface, that is, the catching projection 52 has a serrated cross section.

The intercooler pipe 10 is connected to the connecting port 51 in a state in which the intercooler pipe 10 is coupled to the connector 40. A part of the connector 40 has a stopper 41 that may protrude from an inner circumferential surface of the connector 40.

That is, when the connecting port 51 of the throttle body 50 is inserted into the connector 40 fixedly coupled to one side end of the intercooler pipe 10, the stopper 41 is engaged with and fastened to the catching projection 52 protruding from the outer circumferential surface of the connecting port 51 (when the stopper passes over the inclined surface and then reaches the vertical surface), the throttle body 50 is prevented from being retracted).

Further, the stopper 41 of exemplary embodiments of the present disclosure prevents the withdrawal of the connector 40, but permits a slip between the intercooler pipe 10 and the throttle body 50 because the connector 40 coupled to the intercooler pipe 10 is not tightened to the extent that the rotation of the intercooler pipe 10 is inhibited in the connecting port 51.

For reference, although not illustrated, the intercooler, which also has a connecting port having a catching projection similar to the structure of the throttle body 50, is coupled to the intercooler pipe 10 through the connector 40 of the present disclosure, and as a result, a slip is also permitted between the intercooler and the intercooler pipe 10.

Furthermore, a rubber seal 42, which seals a portion between the connector 40 and the connecting port 51 when the connector 40 is fastened to the connecting port 51, is mounted in the connector 40. In the present disclosure, the rubber seal 42 is mounted to be positioned at a front side of the catching projection 52 (on the right in FIG. 9), but the rubber seal 42 may be mounted at other positions (e.g., in a groove into which the stopper is fitted at a rear side of the catching projection in FIG. 9), and at least one of frictional force between the rubber seal 42 and the connector 40 and frictional force between the rubber seal 42 and the connecting port 51 is set to be small enough to permit the rotation of the connector 40.

The frictional force may be set by manufacturing the rubber seal 42 by using a material with a small frictional coefficient or by adjusting a gap (or interference level) between the rubber seal 42 and the connector 40 or a gap (or interference level) between the rubber seal 42 and the connecting port 51.

The intercooler pipe 10 of the present disclosure, which adopts the connector 40 having the aforementioned technical features, may be light in weight, reduce costs, and more efficiently reduce noise and vibration in comparison with the intercooler pipe in the related art.

While the configuration of the car intercooler pipe of the present disclosure has been described in detail with reference to the accompanying drawings, the present disclosure may be variously modified, altered, and substituted by those skilled in the art, and it should be interpreted that the modification, the alteration, and the substitution belong to the protection scope of the present disclosure.

What is claimed is:

1. An intercooler pipe for a vehicle, comprising:
   an inlet at an upper portion of the intercooler pipe;
   an upper bellows portion having an upper bellows body which protrudes in a rib shape from a surface of a pipe body extending in a direction toward the inlet;
   an outlet at a lower portion of the intercooler pipe;
   a lower bellows portion having a lower bellows body which protrudes in a rib shape from a surface of the pipe body extending in a direction toward the outlet; and
   an intermediate portion, which has the pipe body, bent downward from the upper bellows portion toward the lower bellows portion and connected to the lower bellows portion,
   wherein each of the upper bellows body and the lower bellows body has disconnection portions having corrugations with different heights;
   wherein a thickness of the pipe body of the intermediate portion is greater than a thickness of the upper bellows body and a thickness of the lower bellows body, such that mass of the intermediate portion is larger than those of the upper bellows portion and the lower bellows portion to have variable mass between the inlet and the outlet,
   wherein the upper bellows portion and the lower bellows portion include a thermoplastic polyester elastomer (TPC-ET) synthetic resin having dicarboxylate-diol polymer and glycol polymer as a soft synthetic resin material,
   wherein the intermediate portion includes a thermoplastic polyester synthetic resin as a hard synthetic resin material such that stiffness varies between the inlet and the outlet, and
   wherein the amount of change in impedance of the intercooler pipe increases as amounts of mass and stiffness vary between the inlet and the outlet, so that a progressive wave of vibration is reflected and vibration transmitted through the intercooler pipe is reduced.

2. The intercooler pipe of claim 1, wherein the disconnection portions are disposed in rows in the form of straight lines in a longitudinal direction of the intercooler pipe so that force required to bend the intercooler pipe in a particular direction and force required to bend the intercooler pipe in another direction are different from each other.

3. The intercooler pipe of claim 2, wherein the rows, which are constituted by the disconnection portions, include two or more rows disposed to be adjacent to one another in the longitudinal direction on each of the upper bellows body and the lower bellows body, and the rows are formed at positions spaced apart from each other around each of the upper bellows body and the lower bellows body.

4. The intercooler pipe of claim 1, comprising:
   a connector having a stopper protruding from an inner circumferential surface of the connector and coupled to an end of the intercooler pipe to fasten the intercooler pipe to a connecting port of a throttle body,
   wherein when the connecting port is inserted into the connector, the stopper is engaged with and fastened to a catching projection protruding from an outer circumferential surface of the connecting port, and the connector permits a rotation of the intercooler pipe in the connecting port.

5. The intercooler pipe of claim 4, wherein a rubber seal, which seals a portion between the connector and the connecting port when the connector is fastened to the connecting port, is mounted in the connector, and at least one of a frictional force between the rubber seal and the connector and a frictional force between the rubber seal and the connecting port is set to be small enough to permit the rotation of the connector.

\* \* \* \* \*